3,339,893
FOLDING PULLAWAY SYSTEM
Henry W. Schuette, Baltimore, Md., assignor to the United States of America as represented by the Secretary of the Air Force
Filed Aug. 23, 1966, Ser. No. 574,864
4 Claims. (Cl. 254—127)

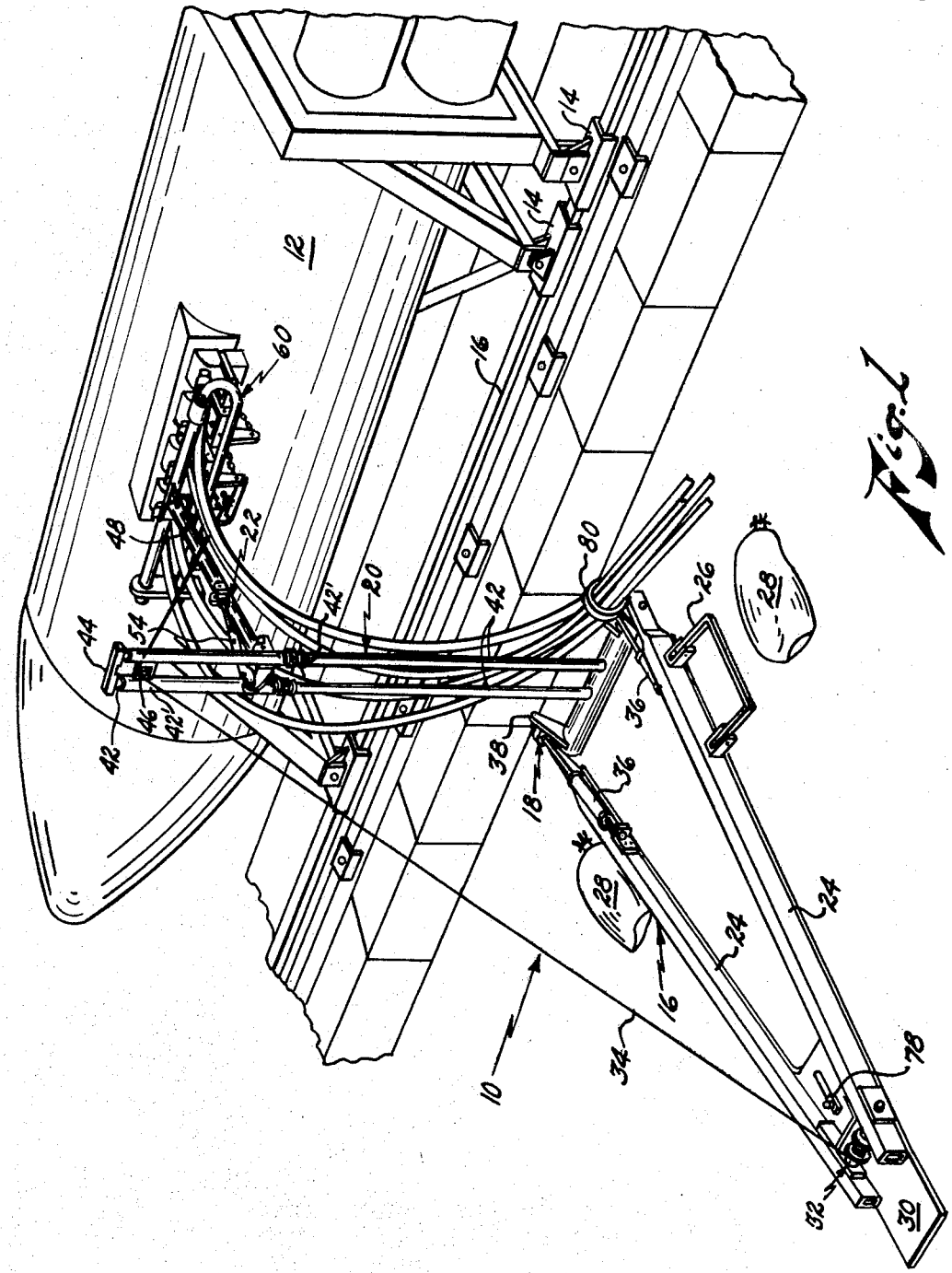

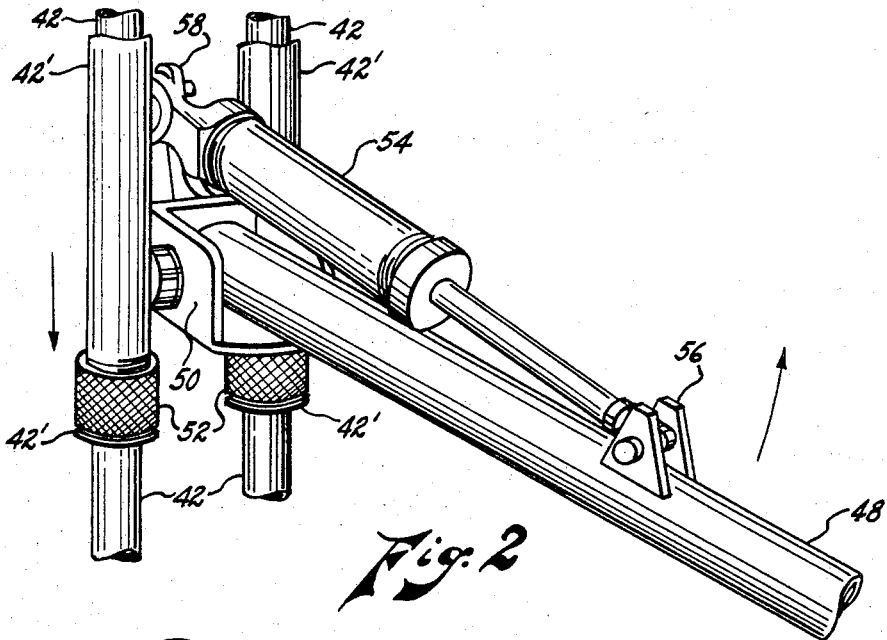
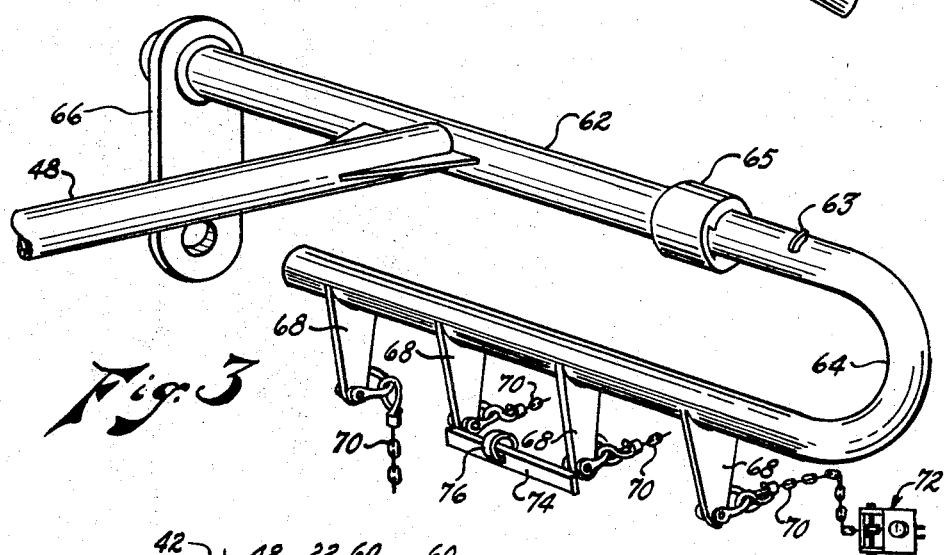
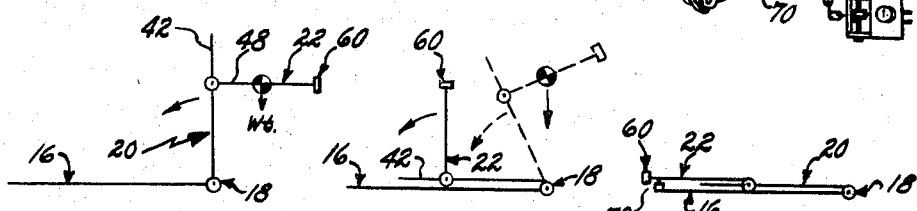
INVENTOR.
HENRY WILLIAM SCHUETTE
BY Harry A. Herbert Jr.
Sherman H. Goldman
ATTORNEYS United States Patent Office 3,339,893
Patented Sept. 5, 1967

This invention relates generally to a folding pullaway system and, more particularly, to a system which provides a controlled release and retraction of umbilical plugs from a variety of rocket sleds, missiles or aerospace vehicles prior to rocket ignition.

Basically, a vehicle pullaway system is a device which is employed to retract the umbilical cables, which are attached to a rocket vehicle, prior to rocket ignition. The device is required to be portable and capable of use with a variety of vehicles and track or guideway configurations. With vehicle systems of this type a blockhouse is generaly utilized for providing actuation of the various systems associated with the sled or aerospace vehicle. The device of this invention is capable of electrical actuation remote from the blockhouse. In order to provide an effective unit the pullaway system must disengage and retract a number of electrical connectors with umbilical cables from the sled or other vehicle to a point distant from its track within a period of approximately 10 seconds after energization of the system. In order to avoid rocket blasting effects the system should present a low profile in the retracted position.

Accordingly, it is an object of this invention to provide a pullaway system which provides reliable operation in order to insure safety.

It is another object of this invention to provide a pullaway system which is lightweight, portable and easily installed.

It is still another object of this invention to provide a pullaway system capable of use with either monorail or dual rail vehicles and which is capable of operation from locations on either side of the vehicle tracks or guideways.

It is a further object of this invention to provide a vehicle pullaway system which removes plugs from the vehicle area and nests them close to the ground to protect them from rocket exhaust.

A still further object of this invention involves a pullaway system for umbilical plugs and cables which tends to straighten the cables rather than bend them and which utilizes an upward and rearward direction for plug removal.

Another object of this invention involves the production of a pullaway system which may be easily and economically manufactured of currently available materials that lend themselves to standard mass production manufacturing techniques.

These and other advantages, features and objects of the invention will become more apparent from the following description taken in connection with the illustrative embodiments in the accompanying drawings, wherein:

FIGURE 1 is an isometric view of the pullaway system applied to a rocket sled;

FIGURE 2 is an isometric view of the arm assembly details of the pullaway system of FIGURE 1;

FIGURE 3 is an isometric view of the umbilical support arrangement of the embodiment of FIGURE 1; and FIGURES 4 through 6 are schematic representations of the various positions of the linkage arrangement of FIGURE 1.

Referring to FIGURE 1, there is shown a pullaway system applied, for example, to a sled whereby umbilical plugs and cables may be removed from the sled prior to rocket ignition. The device is basically of welded aluminum alloy construction since this allows for economical achievement of high strength to weight ratios and takes advantage of the excellent corrosive resisting properties of aluminum in order to allow for improved performance in adverse track environments. The pullaway system is indicated generally at 10 and is shown applied to a sled 12 which has slippers 14 in engagement with tracks 16 (only one of which is shown). The pullaway system may be divided into a base assembly 16, a main pivot assembly 18, an upright or vertical support assembly 20 and a horizontal arm assembly 22.

The base assembly 16 is comprised of a tubular or channel shaped A-frame side element members 24 having mounted thereon fold-out handles 26 which are limited to movement from a vertical to a horizontal position through an arc of approximately 90°. When the weight of the system is insufficient for stability in a rocketry environment, the fold-out handles 26 usually have sandbags 28 placed thereon in order to temporarily fix the pullaway system to the ground. At the apex of the frame a flat plate 30 may be provided for additional sandbags.

Also, located generally at the apex are a D.C. motor, clutch and drum assembly 32 which wind a wire rope cable 34 thereby providing actuation energy for the system. A motor was chosen over mechanical spring mechanisms because of improved reliability and simplicity of design. Springs would require a more complex structure since additional mechanisms are required to control the initiation of spring motion. In addition, springs would be hazardous and are not conducive to smooth plug and cable control. A drum or spool of the motor assembly 32 has the cable 34 attached therethrough and routed as will be described later.

The main pivot assembly 18 is bolted to the trackside end of the base assembly 16 and has two shock absorbers and buffers 36, each being secured at one end to the side element members 24 of the A-frame while the other end is attached to a link or tab 38. The tabs or links 38 are fixedly attached to a horizontal member 40 which is pivoted at its ends to the ends of A-frame side elements 24. The shock absorber members may be of the pneumatic, hydraulic or spring type.

The upright assembly 20 is formed of two tubes 42 which are welded to the pivotable tube 40 of the main pivot assembly 18. The vertical tubes 42 are fixed at their free end by means of a spacer 44 and also by a pulley arrangement 46 through which the cable from the motor system of 32 is arranged. A pair of adjustment tubes 42' is slidable as a unit on tubes 42 and may be locked in place by means of knurled collet clamps 52. Thus far, it should be apparent that the upright assembly 44 is capable of pivotal movement from a substantially vertical position, as shown, to a horizontal position wherein the tubes 20 would lie substantially within the A-frame; the motion being controlled by the shock absorbers and buffers 36.

The horizontal arm assembly 22 is secured to the upright assembly, as is most clearly shown in FIGURE 2. The horizontal arm assembly comprises a tubular arm 48 which is pivoted to a bracket 50 which is welded to slidable portions 42 of vertical arms 42 of the upright assembly for vertical adjustment. A shock absorber and buffer 54 of the pneumatic or hydraulic type is attached between a bracket 56 intermediate the ends of the tubular arm 48 and a bracket 58 mounted on or formed integral with bracket 50. Motion of the tubular arm 48 is arranged to be between the horizontal position shown in FIGURE 2 and a vertical position in alignment with the upright assembly.

At the end of the tubular arm 48 of the arm assembly is provided a T-umbilical support arrangement 60 which is shown most clearly in FIGURE 3. This assembly holds and restrains the umbilical plugs and cables. The T-tube 62 is welded to the arm 48 and has a yoke 64 which slides within the tube 62. A spacer 66 is provided at one end of the T-tube 62 and is mounted for rotation thereon. A series of tabs or links 68 are provided on the yoke 64 to which snap-on chains 70 are attached for connection with a portion of or brackets on plugs 72 which are to be attached or removed from the sled. The chains 20 are preferably made of at least two different lengths such that when a pull is exerted on the chains, all of the plugs 72 are not removed simultaneously. This feature avoids an overloading of the motor of the clutch and drum assembly 32. A support bracket 74 is provided between two of the tabs 68 and has a ring 76 affixed thereto to which the wire cable 34 is secured. The umbilical cables as can be seen in FIGURE 1 are supported within the area enclosed by the T-tube 62, yoke 64 and spacer 66 and are restricted by this arrangement to follow the retraction motion of the device. As was mentioned the yoke 64 slides into the T-tube 62 and is fixed therein by means of an eccentric key 63 which engages in a mating element 65 on the T-tube. Thus, the yoke is removably fixed by the key and the spacer.

When plugs 72, for example of the GMAB type, are installed on a receptacle on the sled 12, the chains 70 are attached to the plugs 72 or their brackets. The umbilical cables are led through the opening formed by the yoke 64, T-tube 62 and spacer 66 down through a cable guide 80 to be led to a blockhouse. Motor 32 would also have its control cables (not shown) directed to the blockhouse. Upon signal from the blockhouse for electrical release of the plugs from receptacles on the sled 12 the D.C. motor 32 is energized such that its rotation causes the wire cable 34 to wind on the drum of the motor. After the umbilical slackness is taken up, further shortening of the cable causes the yoke to rotate about the T-tube thereby mechanically releasing any plugs which are not electrically released. The yoke continues to rotate until it reaches tubular arm 48 or a stop thereon at which point the cable begins to fold the mechanism as is most clearly illustrated in FIGURES 4, 5 and 6.

FIGURE 4 illustrates the position of the elements at plug release with the overhanging weight of the plugs indicated. The motor works against the overhanging weight of the plugs and cables until the center of gravity of the system rotates past the pivot point of the main pivot assembly 18 as shown in dotted lines in FIGURE 5 such that the motor and weight of the system operates against the shock absorbers 36 to lower smoothly the device to the solid line position of FIGURE 2. Further, cable wind up results in retraction of the arm assembly 22 in a manner similar to that previously described until it reaches the reclining position of FIGURE 6 at which point a switch 78, located near the apex of the base assembly 16, is actuated to deenergize the motor.

Since the motion of the cables during retraction process is primarily an unfolding action, relatively easy umbilical cable handling is effected thereby allowing for more prolonged use, especially in cold weather when cables normally become stiff.

The folding device may be installed either before or after umbilical plugs have been mounted on the sled or missile; however, in order to allow for easy set up, a clutch release should be provided on the drum motor assembly 32 to allow free wheeling such that the wire rope 34 may easily be uncoiled to a length sufficient to set up the device. After release of the clutch and extension of the wire rope 34 the entire device is unfolded such that the upright assembly 20 is in the vertical position and the arm assembly 22 is normal to the side of the sled 12. The shock absorbers in the system are mounted to bottom in the normal, installed position. Vertical adjustment is next achieved by loosening the locking collets 52 on the adjustable tubes and locating the tubular arm 48 in the approximate plug area of the sled 12. Sideward adjustment of the pullaway system 10 is accomplished by positioning the base assembly 16 relative to the trackway and sled. After the unit has been positioned, the cables are installed in the device by removing the yoke 64 and positioning the umbilical cables under the T-tube 62 and then replacing the yoke. The clamping ring 80 on the base restrains excessive cable movement. When the snap-on chains 70 are connected to the plugs 72 and yoke tabs 68 the motor is then hand-wound to reduce slack in the cable to a desired minimum. A little slack may be desirable in order to allow for a check of the running of the motor from the blockhouse prior to clearance of personnel from the area.

Thus, it should be apparent that the device is capable of simple installation and adjustment such that the set up time may be less than 30 minutes and operation of the device from initiation to shut-off could be effected in approximately five seconds.

Although the invention has been described relative to a particular embodiment, it should be understood to those skilled in the art that the invention is capable of a variety of alternative embodiments within the spirit and scope of the appended claims. For example, the motor, clutch drum assembly 32 could be battery operated with the initiation only effected by a signal from the blockhouse. Although the example given relates to a sled, it should be obvious that outer space type vehicles and missiles would also be suitable for application of the foldaway device. In addition, an auxiliary motor could be supplied on the horizontal arm assembly 22 in order to provide for continued operation of the device when the primary motor is inoperative. Also, structure allowing vertical adjustments beyond the range achievable with the collet clamps 52 could be effected and the mounting of switch 78 could be adjustably mounted to assure contact by a part of assemblies 22 or 60.

I claim:
1. A pullaway system for removing plugs and cables attached thereto from a vehicle comprising:
   a base,
   a vertical support pivotally mounted in said base,
   an arm pivotally mounted on said vertical support from a position normal to said support upwardly to a position parallel to said support,
   a cable support pivotally mounted to said arm,
   means connected with said cable support adapted for attachment to plugs on a vehicle,
   cable means connected with said cable support and said base, and
   means for shortening the length of cable between said cable support and said base to cause rotation of said vertical support toward said base followed by rotation of said arm toward said base.

2. A device as defined in claim 1 including means for automatically stopping said last-mentioned means when said arm is in position.

3. A device according to claim 1 wherein said vertical support is adjustable in the vertical direction.

4. A device according to claim 1 including shock absorbing means between said base and vertical support and between said vertical support and said arm.

References Cited

UNITED STATES PATENTS 36,671  10/1862  Richardson _____ 254—127

OTHELL M. SIMPSON, *Primary Examiner.*